United States Patent Office 3,040,192

Patented June 19, 1962

3,040,192

LOGIC, EXCLUSIVE-OR, AND SHIFT REGISTER CIRCUITS UTILIZING DIRECTLY CONNECTED CASCADE TRANSISTORS IN "TREE" CONFIGURATION

Edwin J. Slobodzinski, Hopewell Junction, N.Y., assignor to International Business Machines Corporation, New York, N.Y., a corporation of New York Filed July 30, 1958, Ser. No. 751,904
21 Claims. (Cl. 307—88.5)

This invention relates to transistor circuits, more particularly to logic circuits including binary flip-flops, ring counters, shifting registers, and timing circuits.

It has heretofore been proposed to utilize transistors to form logic circuits of many different kinds useful in computers. In order to assure accurate and reliable operation of such logic circuits, time delays have been introduced between the operation of one transistor or one part of the circuit in relation to other transistors and other parts of the circuit. Whenever time delays are introduced by circuit components, the speed of operation of the circuit as a whole is materially reduced.

In carrying out the present invention in one form thereof, direct coupled transistors are used throughout the various circuits embodying the invention. The circuits operate at speeds limited only by the parameters of the transistors themselves. By utilizing the principles of the invention, circuits of many different types may be achieved with each capable of operation at the high speeds heretofore mentioned. More particularly and in its simplest form, a circuit embodying the invention makes use of three pairs of transistors. These transistors are connected with suitable biasing means and so arranged that when a transistor of a first input pair is rendered conductive, the other transistor of that pair is rendered non-conductive, and vice versa. A single-applying means, representative of a variable "A," is associated with at least one such transistor. The input electrodes of a second pair of the transistors are interconnected; and so are the input electrodes of a third pair of the transistors. An output connection is provided from each of the transistors of said first pair. One of said output connections interconnects an input transistor and the input electrodes of the second pair of transistors, while the other of them interconnects the other input transistor and the input electrodes of the third pair of transistors. A control electrode of one transistor of each of said second and third pairs is connected to a source of reference potential, while input signal-applying circuits are provided for the control electrodes of the remaining transistors of the second and third pairs. Output circuits extend from selected transistors of the latter pairs. Where there is an output circuit from each transistor of each of the second and third pairs, and where a signal representative of a variable "B" is applied to the interconnected control electrodes of a transistor in each of said second and third pairs, the outputs will be respectively representative of $A \cdot B$, $A \cdot \overline{B}$, $\overline{A} \cdot \overline{B}$, and $\overline{A} \cdot B$. With selected outputs, or more particularly, by interconnecting selected outputs, an EXCLUSIVE-OR circuit is formed, etc.

By adding additional pairs of transistors, there may be provided a binary flip-flop. This circuit, by a rearrangement of a single connection and by duplicating the binary flip-flop circuit will provide a plurality of stages to form a shifting register which may include N-number of stages. By including an additional connection, the shifting register of N-stages may be converted to a ring counter or timing circuit.

For further objects and advantages of the invention and for additional variations in the types of circuits which may be formed, reference is to be had to the following detailed description taken in conjunction with the accompanying drawings, in which.

Figure 1:
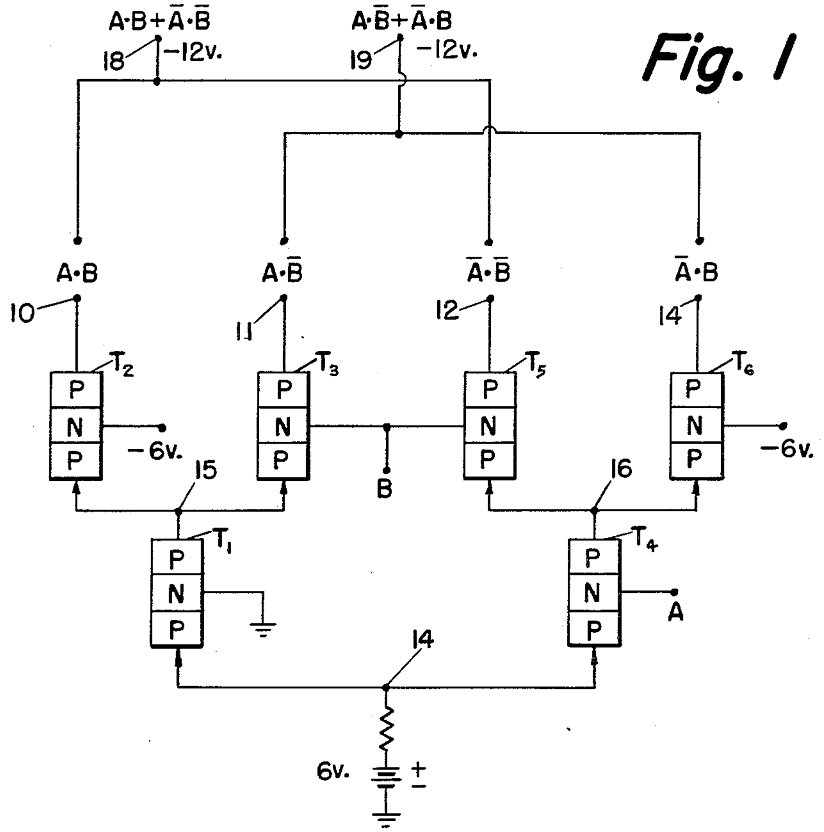
FIG. 1 is a circuit diagram of an EXCLUSIVE-OR circuit with complemented outputs.

Referring now to FIG. 1, I have shown my invention in one form to provide an EXCLUSIVE-OR circuit with complemented outputs. In this connection, advantage is taken of certain features of the invention of Hannon S. Yourke, as disclosed in his application Serial No. 622,307, filed November 15, 1956, entitled "Transistor Switching Circuits," now Patent No. 2,964,652, and assigned to the same assignee as the present invention.

More particularly, I provide transistors $T_1$—$T_6$ connected as illustrated and including an input terminal A for transistor $T_4$ and an input terminal B for transistors $T_3$ and $T_5$. The transistors $T_1$ and $T_4$ have their emitters connected together, as do the pairs of transistors $T_2$, $T_3$ and $T_5$, $T_6$. Transistors $T_1$, $T_2$ and $T_6$ are biased in the forward direction by the indicated sources of supply. Nevertheless, there will not be any output at any of the output terminals 10—14 unless certain conditions are met, as will now be explained. If a positive impulse be applied to terminal A, transistor $T_4$ of the PNP type will be made non-conductive. As a result, the voltage at the node 14 will become more positive which is the same as making the base of transistor $T_1$ more negative relative to its emitter. Accordingly, transistor $T_1$ will be rendered conductive. Current will flow through one or the other of transistors $T_2$ or $T_3$. More particularly, if there be concurrently applied to input terminal B a positive pulse, the transistor $T_3$ will be made non-conductive, the node or common connection 15 will, accordingly, be made more positive and, hence, the transistor $T_2$ will be made conductive. Thus the presence of input pulses representative of positive inputs at A and B will produce an output at the terminal 10 representative of the term $A \cdot B$. If the positive pulses are assumed to correspond with "one" and negative pulses with "zero," the circuit will function in accordance with well understood rules of Boolean algebra. This assumption of positive pulses for "ones" and negative pulses for "zeros" will be made for the purposes of the remaining description.

Assuming again that there is applied to the input terminal A a positive pulse and that $T_1$ is thereby made conductive, and further assuming that at input terminal B there is applied a negative pulse, it will be seen at once that transistor $T_3$ is made conductive, while transistor $T_2$ is made non-conductive. Accordingly, at output terminal 11 the output will be representative of $A \cdot \overline{B}$.

With the above understanding of the invention, it will now be clear that a negative pulse applied at input terminal A will make transistor $T_4$ conductive and transistor $T_1$ non-conductive. If with a negative pulse applied at A, a negative pulse is applied at B, transistor $T_5$ will be made conductive and transistor $T_6$ non-conductive. Accordingly, the resulting output signal at terminal 12 will be representative of $\overline{A} \cdot \overline{B}$. However, if with a negative impulse at A, a positive impulse is applied at B, then transistor $T_5$ will be made non-conductive and the transistor $T_6$ conductive, the output at terminal 14 then being representative of $\overline{A} \cdot B$. The described circuit has usefulness with the outputs taken from terminals 10—14. It also has usefulness if output terminals 10 and 12 be connected together and with output terminals 11 and 14 connected together to provide two output circuits as at terminals 18 and 19. From inspection, it will be seen that the output at terminal 19 will provide a useful circuit known to those skilled in the art as an EXCLUSIVE-OR circuit, while the output at terminal 18 will be the complement of that EXCLUSIVE-OR circuit.

It is to be noted that the EXCLUSIVE-OR circuit, with complemented outputs, is direct and conductively coupled throughout. There is thereby realized a speed of operation limited only by the inherent parameters of the transistors themselves. Stated differently, there is lacking in the circuit of FIG. 1 any delays resulting from the requirements of coupling capacitors or inductance in any part of the system. By reason of the operation of the component parts of the system resulting from tying the emitters of the selected pairs to common nodes or the same points of potential, reliability of operation is achieved and with utilization of a conservative number of circuit components needed to provide the EXCLUSIVE-OR circuit with complemented outputs.

It is to be understood that the system of FIG. 1 may be readily extended by providing additional pairs of transistors, one for each of the output circuits from transistors $T_2$—$T_6$. The output circuits from each transistor of the added pair may in turn be applied to the common input or emitter circuits of subsequent pairs of transistors, thus to extend the capabilities of the invention in building logic circuits of different character.

By utilizing a number of the features incorporated in the embodiment of FIG. 1, there may be provided a shifting register or ring counter from which outputs of different character may be obtained. In the binary trigger or flip-flop circuit of FIG. 2, use is made of transistors respectively of the PNP and NPN types. The transistors $T_1$—$T_6$ of the PNP type are connected in manner quite similar to corresponding transistors of FIG. 1. Their association with the parallel connected NPN transistors $T_8$, $T_9$ and $T_{11}$, $T_{12}$ represent substantial differences, as well as the addition of the output transistors $T_7$ and $T_{10}$ also of the NPN type. Output circuits have been illustrated at 21 and 22, and an output circuit as indicated at 23. The output from terminals 23 will correspond with a half period of the input pulse repetition frequency every second period. The manner in which the foregoing operations are achieved may be readily understood by assuming the application to input terminals 25 of positive-going and negative-going input impulses of a given repetition frequency. The first impulse $C_1$ is a positive-going impulse which as applied to PNP transistor $T_4$ is in a direction for that transistor to be non-conductive. The application of the positive pulse to the base of transistor $T_4$ has the result of turning on or making conductive transistor $T_1$.

As will be later explained, transistor $T_2$ will have been conditioned to be made conductive upon application to the base thereof of the output from transistor $T_8$. Accordingly, when transistor $T_2$ is made conductive, transistors $T_9$ and $T_{11}$ are made conductive respectively by the positive pulse applied to the bases thereof. Current flows from ground through transistor $T_9$ and by conductor 26 and a resistor 27 to the current sink provided by that resistor and the battery 28. The result is that the emitter of transistor $T_7$ is made more positive and thus is less negative with respect to the base. Accordingly, transistor $T_7$ is non-conductive and has an output which may be considered a positive pulse. This positive pulse is a continuing one and is indicated at 31, FIG. 3. Since $T_{11}$ was made conductive, current flows from ground by way of that transistor, a resistor 29, and thence to battery 30. The transistor $T_{10}$ continues to be biased to a non-conductive state in the same manner as described for transistor $T_7$, and thus there appears at the output from $T_{10}$ a positive output pulse as indicated at 32, FIG. 3. The origin of this output pulse corresponds on a time base with that of the appearance of the positive-going input pulse $C_1$.

When the clock or timing impulse applied to input terminals 25 changes from a positive level to negative level, as at $C_2$, transistor $T_1$ is made non-conductive and transistor $T_4$ is made conductive. Inasmuch as the current flow through transistor $T_{11}$ was from ground by way of a resistor 34*a*, transistor $T_5$ was conditioned to be conductive, that is, the base was made more negative, and adequately so, to insure conduction of transistor $T_5$ when transistor $T_4$ is made conductive. An output impulse appears at output terminals 23 when transistor $T_5$ is made conductive, this output impulse being shown at 35, FIG. 3. The application of the output impulse from transistor $T_5$ to transistor $T_{12}$ makes this transistor conductive. With either of transistors $T_{11}$ or $T_{12}$ conductive, transistor $T_{10}$ is maintained non-conductive in manner heretofore described.

At the time transistor $T_1$ was made non-conductive by input pulse $C_2$, it effectively turns off or renders non-conductive transistors $T_2$, $T_9$ and $T_{11}$. When transistor $T_9$ is made non-conductive (and at the time transistor $T_8$ is likewise non-conductive), transistor $T_7$ is made conductive inasmuch as the negative bias applied to its base is overcome by the increased negative bias at the emitter so that the base is effectively made more positive than the emitter. The resulting forward bias results in current flow through transistor $T_7$ to develop at the output 21 a negative-going output pulse, indicated at 31*a*, FIG. 3.

Figure 3:
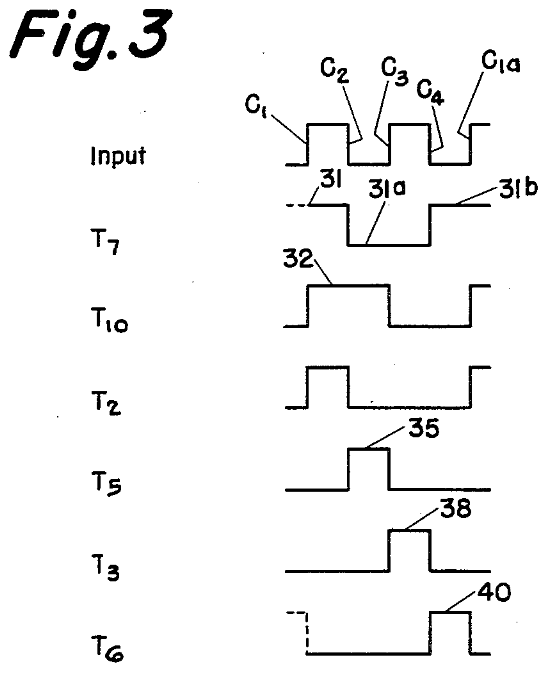
FIG. 3 is a timing diagram useful in obtaining an understanding of the operation of the FIG. 2 circuit.

At a time interval after the application of negative-going impulse $C_2$, there is applied to input terminal 25 the positive-going impulse $C_3$. As before, the positive-going impulse makes non-conductive transistor $T_4$ which in turn makes transistor $T_5$ non-conductive, and this transistor turns off transistor $T_{12}$. Since transistors $T_{11}$ and $T_{12}$ are both non-conductive, the positive output pulse 32, FIG. 3, is terminated, that is to say, the output of transistor $T_{10}$ is then negative-going. As before, the positive-going pulse $C_3$ turns on transistor $T_1$, but since neither transistor $T_8$ nor $T_9$ was conductive prior to the application of impulse $C_3$, transistor $T_2$ was not conditioned to be conductive. Accordingly, when transistor $T_1$ is made conductive, transistor $T_3$ is made conductive in preference to transistor $T_2$. This will be obvious by noting that the base of transistor $T_3$ is returned to ground instead of to the voltage-dividing bias network which includes resistors 36 and 37 and the positive source of supply indicated at the terminal labeled +6. There is, of course, an output pulse 38 for transistor $T_3$, as illustrated in FIG. 3. It may be here noted that the last-mentioned operation does not condition for conduction any of the transistors of the system and, in particular, transistor $T_5$ is not conditioned to be conductive when transistor $T_4$ next is made conductive. Accordingly, when the next negative-going timing impulse $C_4$ is applied to the input terminal 25, transistor $T_4$ is made conductive. This turns on transistor $T_6$. It may here be observed that transistor $T_3$ may be a diode, since while forming a part of the switching operations in the manner hereinbefore described, such switching operations can be performed with a diode replacing transistor $T_3$ quite as well as by the illustrated transistor.

When transistor $T_6$ is made conductive, the output pulse 40, FIG. 3, is applied by way of conductor 41 to the base of NPN transistor $T_8$, thereby turning it on. When transistor $T_8$ is turned on, it makes transistor $T_7$ non-conductive to develop at the output 21 a positive-going pulse as illustrated at 31*b*, FIG. 3. The current flow in conjunction with the voltage dividers 36, 37 conditions transistor $T_2$ to be conductive for the operation next to be described.

It may here be observed there have now been described in the preceding paragraphs certain of the operations tactily assumed to have occurred in the beginning of the description. For completeness, reference will be made now to the application to the input terminals 25 of a further positive-going impulse $C_{1a}$ which produces the same operations in the system as the initially-described impulse $C_1$. Positive-going impulse $C_{1a}$ turns off transistor $T_4$, turns on transistors $T_1$, $T_2$ and $T_9$, the latter transistors turning off the transistor $T_8$ and at the same time maintaining non-conductive transistor $T_7$. Transistor $T_{11}$ is likewise turned on to condition transistor $T_5$ for conduction upon application of the next negative-going impulse.

It will be observed that the bias circuit for the bases of transistors $T_9$ and $T_{11}$ and for the collector of transistor $T_2$, including the terminals labeled —12 and —6 and the resistors 43 and 44, includes a peaking coil 45 which has a pulse-sharpening effect useful but not essential to the operation of the system. A similar biasing circuit for the base of transistor $T_{12}$ and the collector of transistor $T_5$ includes resistors 46 and 47 and a similar peaking coil 48. Another similar biasing circuit for the base of transistor $T_8$ and the collector of transistor $T_6$ includes resistors 50 and 51 and a similar peaking coil 49.

While those skilled in the art will understand how to select the values of resistors, the peaking coils and the voltages required of each of the sources, it may be helpful to refer to the following table of values found suitable in one embodiment of the invention. The following table is to be referred to in conjunction with the voltage values appearing in FIGS. 1, 2 and 4:

| | |
|---|---|
| Resistor **20** | 3.4K |
| Resistors **27** and **29** | 4.5K |
| Resistors **34a**, **36**, **44**, **47** and **51** ohms | 240 |
| Resistors **34b**, **37**, **43**, **46** and **50** | 2.45K |
| Peaking coils **45**, **48** and **49** microhenries | 2.7 |

Figure 2:
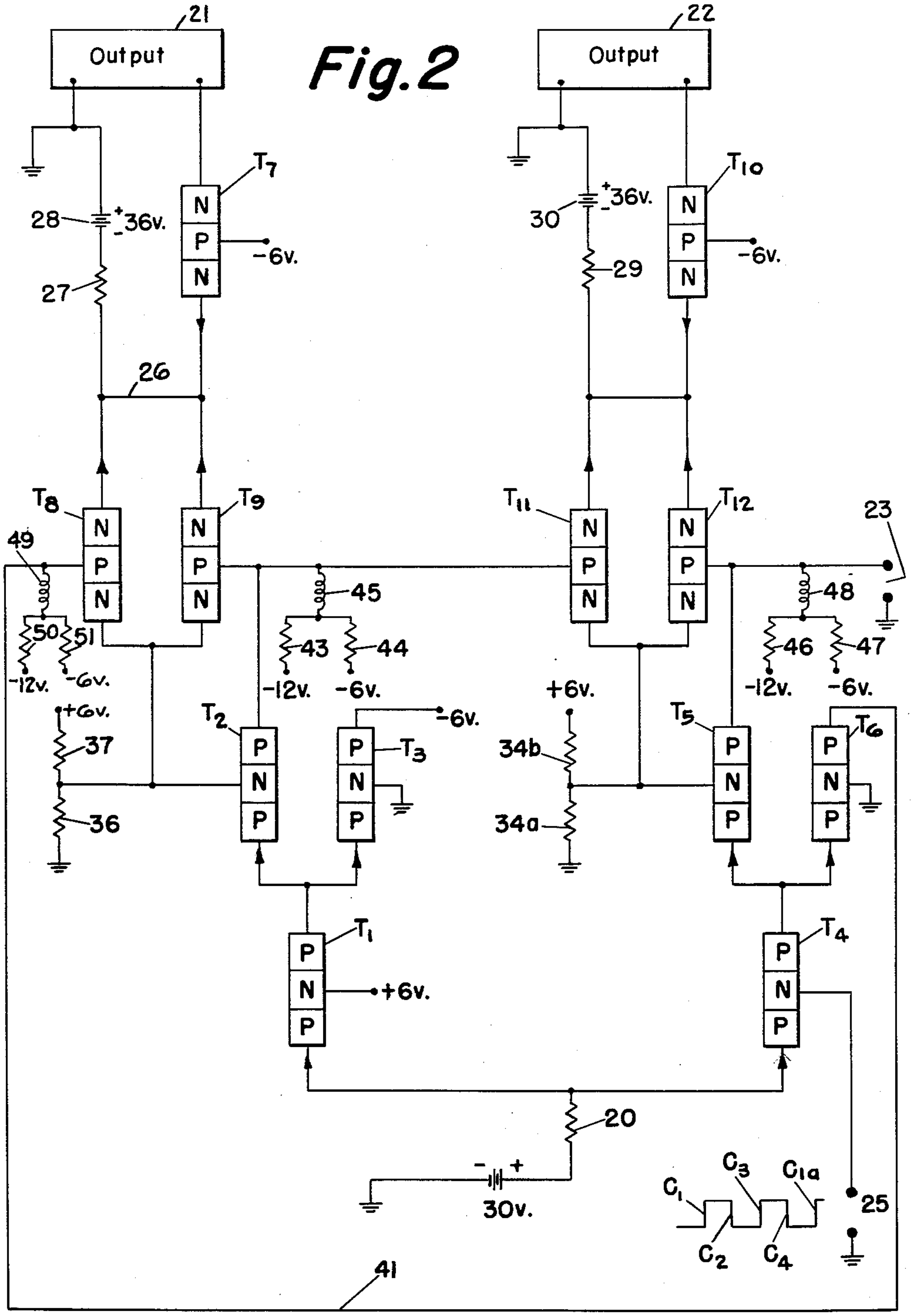
FIG. 2 is a circuit diagram of a binary flip-flop circuit.

The circuits of FIGS. 1 and 2 are useful in systems forming shifting registers. As a matter of fact, the ring counter may be considered a special case of a shifting register. However, in FIG. 4, now to be described, there have been illustrated two stages of a shifting register. As in the preceding embodiments, the system or logic circuit of FIG. 4 includes at least three pairs of transistors. The first pair may be identified as the transistors $T_1$ and $T_4$. They have associated with them means for rendering one of the transistors conductive as the other is rendered non-conductive, and vice versa. The signal-applying means includes the input terminals 25 for applying a signal to at least one of the transistors, namely, the transistor $T_4$ of the first pair. The input electrodes of the second pair of transistors $T_2$ and $T_3$ are interconnected. Similarly, the input electrodes, specifically the emitters, of the third pair of transistors are interconnected. There is an output connection between the transistor $T_1$ of the first pair and the emitters of the second pair of transistors $T_2$ and $T_3$. Similarly, the transistor $T_4$ of the first pair has its output electrode, the collector, connected to the emitters of transistors $T_5$ and $T_6$. It will be observed that the base of each transistor $T_3$ and $T_6$ is connected to a source of reference potential illustrated as a —6 volts.

In FIG. 2 the reference potential is ground. There is a control means for the base of transistor $T_2$ which is used for conditioning it for conduction. There is a similar connection to the base of transistor $T_5$. The output circuits from transistors $T_2$ and $T_5$ extend respectively to conductors 61 and 62. The conductor 61 interconnects the base of each of transistors $T_9$ and $T_{11}$, while the conductor 62 interconnects the base of each of transistors $T_{12}$ and $T_{20}$. The transistors $T_8$ and $T_9$ are connected in parallel with each other; so are transistors $T_{11}$ and $T_{12}$. An output circuit extends from the common node as from the emitters of transistors $T_8$ and $T_9$, by way of an output transistor $T_7$ to the output terminals 63. Similar output terminals 64, 65 and 66 are provided. The remaining portion of the first stage of the shifting register includes the parallel-connected transistors $T_{11}$ and $T_{12}$ and the output transistor $T_{10}$.

It will be seen by inspection that the second stage of the shifting register including the transistors $T_{13}$ and $T_{16}$ of the first pair thereof is identical with the first stage, a number of the principal parts of which have already been described. Resistors 67 and 68 are connected to bias potentials which are effective through a connection to bias transistor $T_2$ to its non-conductive state. This transistor is made conductive when it has first been conditioned by one or the other of transistors $T_8$ and $T_9$ to be conductive and upon application to it of the output from transistor $T_1$. Like connections are provided for transistors $T_5$, $T_{14}$ and $T_{17}$.

Assuming now that a positive input pulse S representative of "1" has been applied to the input terminals 70 of transistor $T_8$ and that the first negative-going impulse $C_1$ of a succession of impulses from the "clock" supply has been applied to the input terminals 25, it will be seen at once that the negative-going pulse will make transistors $T_4$ and $T_{16}$ conductive. The positive pulse applied to the base of transistor $T_8$ of the NPN type makes that transistor conductive and conditions transistor $T_2$ to be conductive. However, since transistor $T_1$ is non-conductive, transistor $T_2$ does not conduct until there is applied to the input terminals 25 the positive-going impulse $C_2$. With transistor $T_8$ conducting, the NPN transistor $T_7$ remains non-conductive with a positive output at output terminals 63.

As positive-going pulse $C_2$ is applied to input terminals 25, transistors $T_4$ and $T_{16}$ are made non-conductive, and transistors $T_1$ and $T_{13}$ are made conductive. As noted above, transistor $T_2$ is made preferentially conductive, and transistor $T_3$ remains non-conductive. As transistor $T_2$ becomes conductive, its output is applied to NPN transistor $T_9$ which is thereby made conductive with a resultant change of bias on transistor $T_8$ to turn it off. The positive output continues to be developed, however, at output terminals 63 since transistor $T_7$ continues to be off. Transistor $T_9$ holds transistor $T_2$ on, and the output from this transistor, applied to transistor $T_{11}$, makes it conductive and thus produces a positive-going output at the terminals 64, since transistor $T_{11}$ turns off transistor $T_{10}$. Transistor $T_{11}$ conditions transistor $T_5$ to be conductive when transistor $T_4$ is made conductive.

Upon application to the input terminals of negative-going pulse $C_{1a}$, transistors $T_1$ and $T_{13}$ are turned off and transistors $T_4$ and $T_{16}$ are made conductive. Since transistor $T_1$ is turned off, transistors $T_2$ and $T_9$ are also turned off. Since both transistors $T_8$ and $T_9$ are now non-conductive, transistor $T_7$ is turned on to develop at output terminal 63 a negative-going output which can be taken as representative of "0" in Boolean algebra nomenclature. With transistors $T_8$ and $T_9$ turned off, transistor $T_2$ is no longer conditioned to be conductive.

Transistor $T_4$ turns on transistor $T_5$, which had been conditioned to be conductive, and this transistor turns on transistors $T_{12}$ and $T_{20}$. Transistor $T_{12}$ maintains transistor $T_{10}$ off. Therefore, there continues to be developed at output terminal 64 the positive output. It will be noted that one period of the clock has now taken place and that at the end of that period the negative-going pulse $C_{1a}$ has transferred the initial input signal S representative of a bit by way of conductor 62 to the second stage of the shifting register. Thus, as transistor $T_{20}$ is made conductive, transistor $T_{19}$ is made non-conductive for the development at output terminal 65 for the positive-going output signal.

Figure 4:
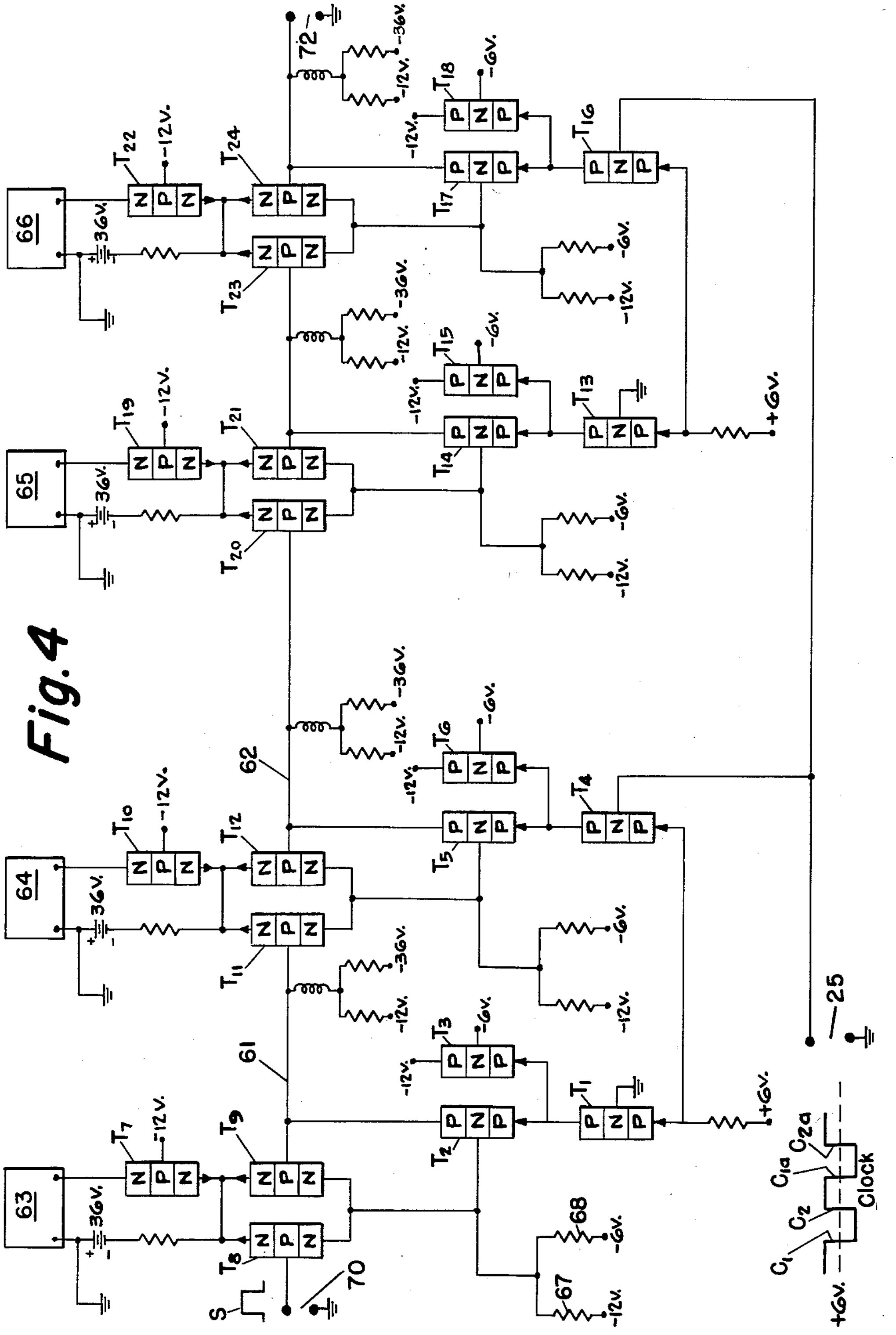
FIG. 4 is a circuit diagram of two stages of an N-stage shifting register.

With the system of FIG. 4 used as a shifting register, there will now be applied to the input terminal 70 another positive pulse if it be desired to enter into the register a "1" bit. If the next bit is a "0," then the absence of the positive-going pulse will be effective to enter the "0" bit into the register.

Returning now to the application of the "1" bit by way of conductor 62 to transistor $T_{20}$ of the second stage, it is to be understood that the operation of the second stage in response to the successive negative-going and positive-going signals from the clock $C_{1a}$ and $C_{2a}$ will be identical with the first stage to transfer the bit to output terminals 72. These output terminals may be connected to additional stages of the shifting register, to other computer components. Alternatively, the output from terminal 72 may be fed into input terminal 70 for timing and counting of the clock or other sources of input pulses applied to input terminals 25.

Assuming now that as the bit representing a "1" entered the second stage of the register, a "0" bit is applied at input terminal 70. This occurs as the clock applies negative-going pulse $C_{1a}$ to input terminals 25. Upon application of the positive-going pulse $C_{2a}$, transistor $T_1$ is again made conductive. However, it will be remembered that transistor $T_2$ was not conditioned to be conductive since both transistors $T_8$ and $T_9$ had been turned off. Accordingly, transistor $T_3$ is made conductive by transistor $T_1$. As transistor $T_1$ was made conductive, transistor $T_4$ was made non-conductive which turned off both transistors $T_5$ and $T_{12}$. Since both transistors $T_{11}$ and $T_{12}$ are now turned off, transistor $T_{10}$ is turned on to develop the negative-going output signal at terminal 64. With both transistors $T_{11}$ and $T_{12}$ off, transistor $T_5$ is no longer conditioned to be conductive and, therefore, upon application of the next negative-going pulse, transistor $T_4$ is made conductive and transistor $T_6$ is then made conductive in preference to transistor $T_5$. It will be clear that transistors $T_8$, $T_9$, $T_{11}$ and $T_{12}$ remain non-conductive and that there is effectively applied to conductor 62 an input signal (or the lack of it) representative of the "0" bit which has now entered the second stage of the register. At this time there has appeared the "1" bit at output terminals 72.

Now that the principles of the invention have been explained and the applicability to a number of different types of circuits has been demonstrated, it will be understood that where PNP transistors have been disclosed, NPN types may be substituted, and vice versa, the required changes in polarity of the sources of supply and bias potentials being modified accordingly. It is to be further understood that while the transistors have been illustrated with grounded base connections, the other types of connections of transistors may be utilized where different electrodes of the transistors will serve as control and output electrodes thereof. With all of the foregoing in mind, it will be clear that many changes and departures may be made from the particular examples set forth in the specification, all within the scope of the invention as set forth by the appended claims.

What is claimed is:

1. A circuit comprising at least three pairs of transistors, means associated with at least a first pair of said transistors for rendering one of its transistors conductive as the other is rendered non-conductive and vice versa, signal-applying means for at least one of said transistors of said first pair, a common conductor interconnecting the control electrode of one of said transistors of a second of said pairs with a control electrode of one of said transistors of a third of said pairs, and means including circuit connections between the output electrode of each of said transistor of said first pair respectively to the control electrode of at least one of said transistors of said second and of said third pairs for selectively controlling the conductivities of each of said transistors of said second and of said third pairs.

2. The circuit of claim 1 in which means are provided to apply input signals to said common conductor.

3. The circuit of claim 1 in which signals representative of a "1" and a "0" are applied to said common conductor representative respectively of B and $\overline{B}$, said signals applied by said signal-applying means being representative of a "1" and a "0" and representative of A and $\overline{A}$, whereby said transistors of said second and of said third pairs will develop signals representative of $A \cdot B$, $A \cdot \overline{B}$, $\overline{A} \cdot \overline{B}$ and $\overline{A} \cdot B$.

4. The circuit of claim 3 in which the output circuits of said transistors representative of $A \cdot \overline{B}$ and $\overline{A} \cdot B$ are connected together to form an EXCLUSIVE-OR circuit and in which the remaining output circuits are connected together to form the complement of said EXCLUSIVE-OR circuit.

5. The circuit of claim 1 in which said last-named means includes in its said circuit connections two additional pairs of transistors, one pair having the input circuits thereof connected to a transistor of said first pair and the other of said pairs having their input circuits connected to the other transistor of said first pair, and one transistor of each said additional pair having its output circuit connected to at least one transistor of each of said second and said third pairs.

6. The circuit of claim 4 in which the base of a transistor of each of said additional pairs is connected to a reference potential and in which the base of each of the remaining transistors of said last-named pairs is connected, one to the collectors of the transistors of said second pairs and the other to the collectors of said third pairs.

7. The circuit of claim 5 in which said bases respectively connected to said collectors are also connected to bias potentials which upon conduction of a transistor of said second or said third pairs respectively conditions a transistor of said additional pairs for conduction in preferance to said transistor of that pair connected to said reference potential.

8. A logic circuit comprising at least three pairs of transistors, the emitters of each pair being connected to a common node, means including an input circuit to one of the transistors of a first of said pairs for rendering conductive one of its said transistors upon application of an impulse of one polarity and for rendering the other of its transistors conductive when said applied impulse is of the opposite polarity, each of said transistors of said first pair having its output circuit connected respectively to input circuits of at least one transistor of each of said remaining pairs of transistors, means including a second input circuit for simultaneously applying a second input signal to a transistor of each of said remaining pairs for rendering one or the other of them conductive depending upon the polarity of the applied impulse to said second input circuit and upon the conductivity of the transistor of the first pair, whereby the transistors of said remaining pairs of transistors develop at the output circuits thereof outputs representative respectively of $A \cdot B$, $A \cdot \overline{B}$, $\overline{A} \cdot \overline{B}$ and $\overline{A} \cdot B$, where A, $\overline{A}$ and B, $\overline{B}$ respectively represent input signals for changing to a particular conductivity state a transistor in the event it has an opposite conductivity state upon application of an input signal of one or the other polarity.

9. A circuit comprising a first pair of input transistors having their emitters respectively connected together, means for applying input pulses to one of said transistors which makes one of them conductive and the other non-conductive depending upon whether the input pulses are positive-going or negative-going, a second pair of transistors having their emitters connected to the output of one of the transistors of said first pair, a third pair of transistors having their emitters connected to the output of the other transistor of said first pair, fourth and fifth pairs of parallel-connected transistors, one of said transistors of said second pair having its output connected to the input of one transistor of each of said fourth and fifth pairs, one of said transistors of said third pair having its output connected to the remaining transistor of said fifth pair, means operative for conditioning one of the transistors of each of said second and third pairs of transistors to be conductive when first one and then the other of said first pair of transistors is conductive upon alternate application to said input circuit of like pulses, and an output circuit from said remaining transistor of said fifth pair.

10. The circuit of claim 9 in which there are provided output transistors respectively connected to said fourth and fifth pairs of transistors, and means for maintaining said output transistors conductive when neither of the transistors of said fourth and said fifth pairs is conductive and for making said output transistors non-conductive when either of the transistors of said fourth and of said fifth pairs is conductive.

11. The circuit of claim 9 in which there are N-stages respectively duplicates of the circuit of claim 16 and in which the output circuit from said first stage comprising said output circuit from said remaining transistors of said fifth pair is connected to the control electrode of the remaining transistor of the fourth pair of the succeeding stage, and in which said first-named means applies input pulses to corresponding input transistors of said second stage.

12. The circuit of claim 11 in which an output circuit from the last stage is connected to a control electrode of the remaining transistor of the fourth pair of the first stage to form a counting circuit.

13. A switching circuit comprising three pairs of transistors, each transistor of each pair having a control electrode, an input electrode and an output electrode, said input electrodes of said transistors of each said pair being interconnected, said interconnected input electrodes of the second pair being connected to one of said output electrodes of said first pair, said interconnected input electrodes of the third pair of transistors being connected to the other of said output electrodes of said first pair of transistors, means including a source of current connected between said input electrodes of the first pair of transistors and said individual output electrodes of the transistors of said second and of said third pairs, a first signal-input means coupled to the control electrode of one of said transistors of said first pair, a second signal-input means coupled respectively to the control electrode of one transistor of each of said second and of said third pairs, and means including connections to the remaining control electrodes of said transistors of said three pairs for establishing predetermined potentials, each with respect to the potential of its associated input electrode for selective switching between conductive and non-conductive states of all said transistors under the joint control of said signal-input means, the switching to one of said states of a transistor of any one of said pairs thereby switching to the opposite of said states the other transistor of that pair.

14. The circuit of claim 13 in which a common conductor interconnects said last-named control electrodes.

15. The circuit of claim 13 in which the output circuits of selected transistors are to be connected together to form an EXCLUSIVE-OR circuit and in which the remaining output circuits are connected together to form the complement of said EXCLUSIVE-OR circuit.

16. The circuit of claim 13 in which there are provided two additional pairs of transistors, each pair being connected in parallel and in which the output circuits of each of the transistors having input signal-applying circuits thereto are connected respectively to a control electrode of a transistor of each of said parallel-connected pairs.

17. The circuit of claim 16 in which a control electrode of each of said transistors having input signal-applying circuits thereto is connected respectively to the input electrodes of the associated parallel-connected pair of transistors.

18. The circuit of claim 17 in which said output circuit of one of the transistors having an input signal-applying circuit is connected respectively to control electrodes of two transistors, one in a first of said parallel-connected pairs and the other in the other of said parallel-connected pairs, and in which the output circuit of the transistor in the last-named pair having a control electrode connected to a reference potential is connected to the control electrode of the remaining transistor of one of said parallel-connected pairs.

19. The circuit of claim 17 in which said output circuit of one of the transistors having an input signal-applying circuit is connected respectively to control electrodes of two transistors, one in a first of said parallel-connected pairs and the other in the other of said parallel-connected pairs, and in which the output circuit of the transistor in the last-named pair having a control electrode connected to a reference potential is connected to the control electrode of the remaining transistor of one of said parallel-connected pairs, and an output transistor connected in series with output electrodes of each of said parallel-connected pair of transistors.

20. A switching circuit comprising at least two pairs of transistors, each transistor of each pair having a control electrode, an input electrode and an output electrode, means connecting the input electrodes of said second pair to the output electrode of one of said transistors of said first pair, means including a source of supply connected in series between said input electrodes of said first pair and said output electrodes for flow of current through one or the other of said transistors of said first pair and through one or the other of said transistors of said second pair, signal input means respectively connected to the control electrode of one transistor of said first pair and to one transistor of said second pair for selectively applying signal potentials to render conductive and to render non-conductive said one transistor of said first pair and said one transistor of said second pair, and means connected to the control electrode of the other transistors of said pairs for establishing potentials of magnitude which produce conductivity states of each said other transistor opposite to that produced by said signal input means, whereby when said signal-input means to a transistor of said first pair renders conductive said one transistor of that pair current will flow through one or the other of the transistors of said second pair depending upon whether said signal-input means applies to a transistor of said second pair an input signal which renders that transistor conductive or non-conductive.

21. A switching circuit comprising a first pair of transistors having control electrodes, interconnected input electrodes and individual output electrodes, a second pair of transistors having interconnected input electrodes connected to one of said output electrodes of said first pair of transistors and having individual control electrodes and individual output electrodes, a source of current for said transistors including a connection to said input electrodes of said first pair, means including connections to a control electrode of said transistors of said first pair and to a control electrode of said transistors of said second pair for establishing a predetermined potential relative to the potential of its associated input electrode, and signal-input means coupled respectively to the control electrode of the other of said transistors of said first pair and to the control electrode of the other of said transistors of said second pair for selectively switching current flow from said source to (1) the other output electrode of said first pair or to (2) one of said output electrodes of said second pair.

References Cited in the file of this patent

UNITED STATES PATENTS

| | | |
|---|---|---|
| 2,838,675 | Wanlass | June 10, 1958 |
| 2,838,690 | Eckert | June 10, 1958 |
| 2,927,733 | Campbell | Mar. 8, 1960 |

OTHER REFERENCES

The Development of a High Speed Triode Tree Electronic Commutator by Paul Wolfe Cooper, submitted for Master's Degree at MIT (1951), pages 9, 11, and 32.

The Development of an Electronic Commutator by Hardy C. Martel, submitted for Master's Degree at MIT (1950), page 13.

UNITED STATES PATENT OFFICE

CERTIFICATE OF CORRECTION

Patent No. 3,040,192 June 19, 1962

Edwin J. Slobodzinski

It is hereby certified that error appears in the above numbered patent requiring correction and that the said Letters Patent should read as corrected below.

Column 7, line 57, strike out "of", second occurrence; line 65, for the claim reference numeral "1" read -- 2 --; column 8, line 13, for the claim reference numeral "4" read -- 5 --; line 19, for the claim reference numeral "5" read -- 6 --; line 23, for "preferance" read -- preference --; column 9, line 5, for the claim reference numeral "16" read -- 9 --;

Signed and sealed this 30th day of April 1963.

EAL)

ttest:

NEST W. SWIDER
ttesting Officer

DAVID L. LADD
Commissioner of Patents